United States Patent
John et al.

(10) Patent No.: US 9,972,022 B2
(45) Date of Patent: May 15, 2018

(54) SYSTEM AND METHOD FOR OPTIMIZING ACCESS TO A RESOURCE BASED ON SOCIAL SYNCHRONY AND HOMOPHILY

(75) Inventors: Ajita John, Holmdel, NJ (US); Doree Duncan Seligmann, New York, NY (US)

(73) Assignee: Avaya Inc., Basking Ridge, NJ (US)

(*) Notice: Subject to any disclaimer, the term of this patent is extended or adjusted under 35 U.S.C. 154(b) by 766 days.

(21) Appl. No.: 12/978,955

(22) Filed: Dec. 27, 2010

(65) Prior Publication Data

US 2012/0036446 A1 Feb. 9, 2012

Related U.S. Application Data

(60) Provisional application No. 61/371,212, filed on Aug. 6, 2010.

(51) Int. Cl.
*G06Q 30/02* (2012.01)
*H04L 12/58* (2006.01)
(Continued)

(52) U.S. Cl.
CPC ........ *G06Q 30/0201* (2013.01); *A63F 13/795* (2014.09); *G06F 9/5077* (2013.01); *G06F 11/3438* (2013.01); *G06F 11/3447* (2013.01); *G06F 17/30861* (2013.01); *G06N 3/004* (2013.01); *G06N 99/005* (2013.01); *G06Q 10/06* (2013.01); *G06Q 10/10* (2013.01); *G06Q 30/0241* (2013.01); *G06Q 50/01* (2013.01); *H04L 51/32* (2013.01); *H04L 67/22* (2013.01)

(58) Field of Classification Search
CPC ............................ G06Q 30/0201; H04L 51/32

USPC .................................................. 715/739, 743
See application file for complete search history.

(56) References Cited

U.S. PATENT DOCUMENTS 6,125,394 A * 9/2000 Rabinovich ................... 709/226
6,230,204 B1 * 5/2001 Fleming, III ....... G06F 11/3414
709/224

(Continued)

FOREIGN PATENT DOCUMENTS

ES  WO 2011154038 A1 * 12/2011 ......... H04L 41/0893
KR       20100130003 A  * 12/2010

OTHER PUBLICATIONS

Bing search q=social+network+predict+behavior&sr Feb. 8, 2016.*

(Continued)

*Primary Examiner* — Jeffrey A Gaffin
*Assistant Examiner* — John M Heffington
(74) *Attorney, Agent, or Firm* — Sheridan Ross P.C.

(57) ABSTRACT

Disclosed herein are systems, methods, and non-transitory computer-readable storage media for managing resources. A system for managing resources is configured for categorizing users according to at least one of common user characteristics and common user behaviors with respect to at least a first domain to yield a group of users. The system is also configured for identifying a resource associated with at least one user behavior in a second domain different from the first domain during a first time interval for at least one user from the group of users. The system is further configured for modifying an accessibility of the resource, during a second time interval after the first time interval, with respect to the second domain for at least other users in the group of users based on the at least one user behavior.

14 Claims, 5 Drawing Sheets

(51) Int. Cl.
*G06F 11/34* (2006.01)
*G06Q 50/00* (2012.01)
*G06F 17/30* (2006.01)
*G06N 3/00* (2006.01)
*G06N 99/00* (2010.01)
*G06Q 10/06* (2012.01)
*A63F 13/795* (2014.01)
*H04L 29/08* (2006.01)
*G06Q 10/10* (2012.01)
*G06F 9/50* (2006.01)

(56) References Cited

U.S. PATENT DOCUMENTS

| | | | | |
|---|---|---|---|---|
| 6,473,084 B1* | 10/2002 | Phillips | G06Q 40/04 | 345/440 |
| 6,564,202 B1* | 5/2003 | Schuetze | G06F 17/3061 | |
| 6,567,797 B1* | 5/2003 | Schuetze | G06F 17/3061 | |
| 6,606,615 B1* | 8/2003 | Jennings | G06Q 10/06 | 706/45 |
| 6,658,467 B1* | 12/2003 | Rice | G06Q 30/02 | 709/219 |
| 6,728,752 B1* | 4/2004 | Chen | G06F 17/3025 | 707/999.01 |
| 6,792,399 B1* | 9/2004 | Phillips | G06Q 10/06 | 705/36 R |
| 6,834,372 B1* | 12/2004 | Becker | G06F 17/30876 | 707/E17.112 |
| 6,848,081 B1* | 1/2005 | Yoda et al. | | 715/741 |
| 6,928,474 B2* | 8/2005 | Venkatesan | G06F 17/30902 | 707/999.006 |
| 7,006,098 B2* | 2/2006 | Bickmore et al. | | 345/474 |
| 7,392,481 B2* | 6/2008 | Gewickey et al. | | 715/716 |
| 7,532,882 B2* | 5/2009 | Owen et al. | | 455/418 |
| 7,613,700 B1* | 11/2009 | Lobo | G06Q 10/06 | |
| 7,822,631 B1* | 10/2010 | Vander Mey | G06F 17/30038 | 705/7.29 |
| 7,844,671 B1* | 11/2010 | Lawler | H04L 51/32 | 709/204 |
| 7,941,296 B2* | 5/2011 | Fluegge | G06Q 10/06 | 702/182 |
| 8,095,432 B1* | 1/2012 | Berman | G06Q 10/10 | 705/26.7 |
| 8,117,545 B2* | 2/2012 | Rosenbaum et al. | | 715/719 |
| 8,316,020 B1* | 11/2012 | Kleinmann | G06F 17/30035 | 707/734 |
| 8,381,264 B1* | 2/2013 | Corddry et al. | | 726/3 |
| 8,516,517 B1* | 8/2013 | Strasman | H04N 21/25866 | 725/32 |
| 2002/0198032 A1* | 12/2002 | Sitrick | A63F 13/12 | 463/1 |
| 2003/0061210 A1* | 3/2003 | Sasaki | G06F 17/30867 | |
| 2003/0236879 A1* | 12/2003 | Moritani | G06F 17/30867 | 709/224 |
| 2004/0046775 A1* | 3/2004 | Dong | G06F 17/3071 | 715/700 |
| 2005/0191991 A1* | 9/2005 | Owen et al. | | 455/411 |
| 2006/0104515 A1* | 5/2006 | King | G06F 17/30011 | 382/190 |
| 2006/0149679 A1* | 7/2006 | Nishizawa | G06Q 30/02 | 705/51 |
| 2006/0200434 A1* | 9/2006 | Flinn | G06N 99/005 | 706/12 |
| 2007/0143128 A1* | 6/2007 | Tokarev | G06Q 10/10 | 705/347 |
| 2007/0143281 A1* | 6/2007 | Smirin | G06F 17/30867 | |
| 2008/0085096 A1 | 4/2008 | Marshall | | |
| 2008/0096533 A1* | 4/2008 | Manfredi | G06N 3/006 | 455/412.1 |
| 2008/0158222 A1* | 7/2008 | Li | G06F 17/30247 | 345/418 |
| 2008/0270615 A1* | 10/2008 | Centola et al. | | 709/228 |
| 2009/0012925 A1* | 1/2009 | Brown | | 706/46 |
| 2009/0040289 A1* | 2/2009 | Hetherington et al. | | 348/14.12 |
| 2009/0055435 A1* | 2/2009 | Kiviluoto | G06Q 30/02 | |
| 2009/0144226 A1* | 6/2009 | Tateno | G06F 17/30867 | |
| 2009/0144421 A1* | 6/2009 | Bunch | H04L 43/045 | 709/224 |
| 2009/0172179 A1* | 7/2009 | Miao | H04L 65/602 | 709/231 |
| 2009/0210246 A1* | 8/2009 | Patel | G06Q 50/01 | 705/319 |
| 2009/0216609 A1* | 8/2009 | Westphal | G06Q 30/0601 | 705/26.1 |
| 2009/0216660 A1* | 8/2009 | Westphal | G06Q 30/0601 | 705/26.1 |
| 2009/0234735 A1* | 9/2009 | Maurer | G06F 21/10 | 705/14.49 |
| 2009/0293055 A1* | 11/2009 | Carroll | G06F 9/4856 | 718/1 |
| 2010/0076850 A1 | 3/2010 | Parekh et al. | | |
| 2010/0153175 A1* | 6/2010 | Pearson | G06Q 10/10 | 705/319 |
| 2010/0251129 A1* | 9/2010 | Beringer et al. | | 715/738 |
| 2010/0306762 A1* | 12/2010 | Lindberg | G06F 8/61 | 717/176 |
| 2010/0313140 A1* | 12/2010 | Bank | G06F 17/30702 | 715/747 |
| 2010/0333123 A1* | 12/2010 | Mehta | H04H 60/37 | 725/13 |
| 2011/0035278 A1* | 2/2011 | Fordyce, III | G06Q 20/10 | 705/14.49 |
| 2011/0035280 A1* | 2/2011 | Fordyce, III | G06Q 20/10 | 705/14.53 |
| 2011/0047072 A1* | 2/2011 | Ciurea | G06Q 30/02 | 705/39 |
| 2011/0087519 A1* | 4/2011 | Fordyce, III | G06Q 30/0201 | 705/7.29 |
| 2011/0087550 A1* | 4/2011 | Fordyce, III | G06Q 30/02 | 705/14.65 |
| 2011/0093327 A1* | 4/2011 | Fordyce, III | G06Q 20/10 | 705/14.39 |
| 2011/0125565 A1* | 5/2011 | MacIlwaine | G06Q 30/02 | 705/14.17 |
| 2011/0173198 A1* | 7/2011 | Malleshaiah | G06F 17/30867 | 707/737 |
| 2011/0184792 A1* | 7/2011 | Butcher | G06Q 10/10 | 705/14.13 |
| 2011/0211590 A1* | 9/2011 | Jung | G06Q 30/02 | 370/464 |
| 2011/0214069 A1* | 9/2011 | Jung | G06Q 10/10 | 715/752 |
| 2011/0271328 A1* | 11/2011 | Sutton-Shearer | G06F 21/6245 | 726/4 |
| 2012/0030010 A1* | 2/2012 | Krishnamoorthy | G06Q 30/0241 | 705/14.43 |
| 2012/0041880 A1* | 2/2012 | Shai | | 705/51 |
| 2012/0046017 A1* | 2/2012 | Jennings | G06Q 30/0204 | 455/414.1 |
| 2012/0185540 A1* | 7/2012 | Hildorsson | G06F 17/30958 | 709/204 |

OTHER PUBLICATIONS

De Choudhury et al., "Social Synchrony: Predicting Mimicry of User Actions in Online Social Media", In Proceedings of the 2009 IEEE International Conference on Social Computing (Vancouver, Canada, Aug. 29-31, 2009), SocialCom '09.

Watts, Duncan J., "A Simple Model of Global Cascades on Random Networks", Communicated by Murray Gell-Mann, Santa Fe University, Santa Fe, NM, received for review May 29, 2001.

De Choudhury et al., ""Birds of a Feather": Does User Homophily Impact Information Diffusion in Social Media?", http://arvix.org/abs/1006_1702 Submitted on Jun. 9, 2010.

* cited by examiner

SYSTEM AND METHOD FOR OPTIMIZING ACCESS TO A RESOURCE BASED ON SOCIAL SYNCHRONY AND HOMOPHILY

RELATED APPLICATION

This application claims priority to U.S. Provisional Application No. 61/371,212, filed 6 Aug. 2010, the contents of which are incorporated herein by reference.

BACKGROUND

1. Technical Field

The present disclosure relates to managing resources and more specifically to managing resources for a group of users with common characteristics and/or common behaviors.

2. Introduction

The widespread availability of electronic media channels has resulted in improved the flow of information across the globe. However, this widespread availability of electronic media channels has also resulted in several issues for various entities operating inside and outside of such media channels. In particular, such entities are faced with the task of managing the operation of the electronic media channels and flow of information over such channels on a global scale. For example, one issue that typically arises is resource allocation. That is, with increasing numbers of users accessing the electronic media channels, the demands on the electronic media channels has increased and have required additional allocation of resources. In another example, entities have struggled with how to best enhance the user experience so that the needs of the various users are meet. In still another example, entities have further struggled to address the viral propagation of information over communications channels, such as the viral propagation of negative information regarding the entity.

In response to such issues, many entities typically rely on post-hoc techniques. That is, examining the occurrence of an incident in the past associated with some aspect of the entity, identifying the good and bad attributes of the response by the entity to the incident, and providing corrective actions so that the outcome of a future occurrence of the same or a similar incident is more favorable. For example, an entity managing or using one or more electronic media channels may determine that additional resources may need to be deployed and thereafter can be used to dynamically allocate resources during an emerging incident. However, while such types of post-hoc analysis and solutions can address the recurrence of some types of incidents, they generally provide limited assistance in responding quickly to unexpected incidents.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed herein are systems, methods, and non-transitory computer-readable storage media for managing resources. A system for managing resources is configured for categorizing users according to at least one of common user characteristics and common user behaviors with respect to at least a first domain to yield a group of users. The system is also configured for identifying a resource associated with at least one user behavior in a second domain different from the first domain during a first time interval for at least one user from the group of users. The system is further configured for modifying an accessibility of the resource, during a second time interval after the first time interval, with respect to the second domain for at least other users in the group of users based on the at least one user behavior.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for dynamically managing users, resources, and information in multiple domains. A system, method and non-transitory computer-readable media are disclosed in which users, resources, and information in multiple domains can be managed based social synchrony and homophily of users. A brief introductory description of a basic general purpose system or computing device in FIG. 1 which can be employed to practice the concepts is disclosed herein. A more detailed description of the various embodiments for dynamically managing users, resources, and information in multiple domains will then follow.

In general, users with common characteristics and/or past common behaviors tend to act in a predictable manner. Specifically, such users tend to perform similar actions. For example, users in a group based on common behaviors generally tend follow the action of other users in the group. This is generally referred to as social synchrony. In another example, users in a group based on common characteristics tend to bind together and act similarly. Thus, users in such a group generally tend to follow or perform the same actions as other users in the group. This is generally referred to as homophily.

As stated above, system, method and non-transitory computer-readable media are disclosed in which users, resources, and information in multiple domains can be managed based social synchrony and homophily of users. That is, the analytics of activity in arbitrary domains are first used to group users together. Thereafter, individual behaviors are tracked (in a same or different domain) to identify usage patterns. These usage patterns are then utilized to predict that other members of the group will act in a similar fashion. This information can then be used to drive adaptive systems to more effectively interact with users, allocate resources, or respond to incidents.

As used herein, the term "domain" refers to any sphere of activity, interest, and/or function. Further, a domain can include activities, interests, and/or functions within electronic media channels, outside electronic media channels, or any combination thereof. Although the exemplary embodiments will be primarily described with respect to electronic or online domains, the various embodiments are not limited in this regard. Rather, domains in the various embodiments can include any sphere of activity, interest, and/or function outside electronic or online domains as well.

In the various embodiments, such groups can be identified by first obtaining activity information, user profile information, and any other information associated with users. Thereafter, models for social synchrony and/or homophily can be applied to identify groups of users. In the various embodiments any type of social synchrony or homophily models can be used without limitation. Afterwards, the behaviors of one or more users of the group, with respect to a domain of interest, are monitored. Notably, the domain of interest and the domain on which the groups of users are based need not be the same or related. Finally, this information is used to drive adaptive systems. That is, one or more aspects of user interactions in the domain can adjusted, based on a prediction that the other users in the group will engage in similar behaviors with respect to the domain.

As noted above, the data being analyzed need not be related to the domain of interest. That is, the user information being analyzed to identify the users in a group and the user behaviors being monitored can be associated with in the same or different domains. For example, a group of users can be defined by common user behaviors with respect to a first website, however the behaviors being monitored can be those associated with a second website. In another example, a group of users can be defined by common user characteristics associated with a common hobby or common interest, however the user behaviors being monitored can be associated with hobbies or interests outside those common to the group. However, the various embodiments are not limited to these specific examples and other variations are possible. Some of these variations shall be discussed herein in the various embodiments are set forth. The disclosure now turns to FIG. 1.

Figure 1:
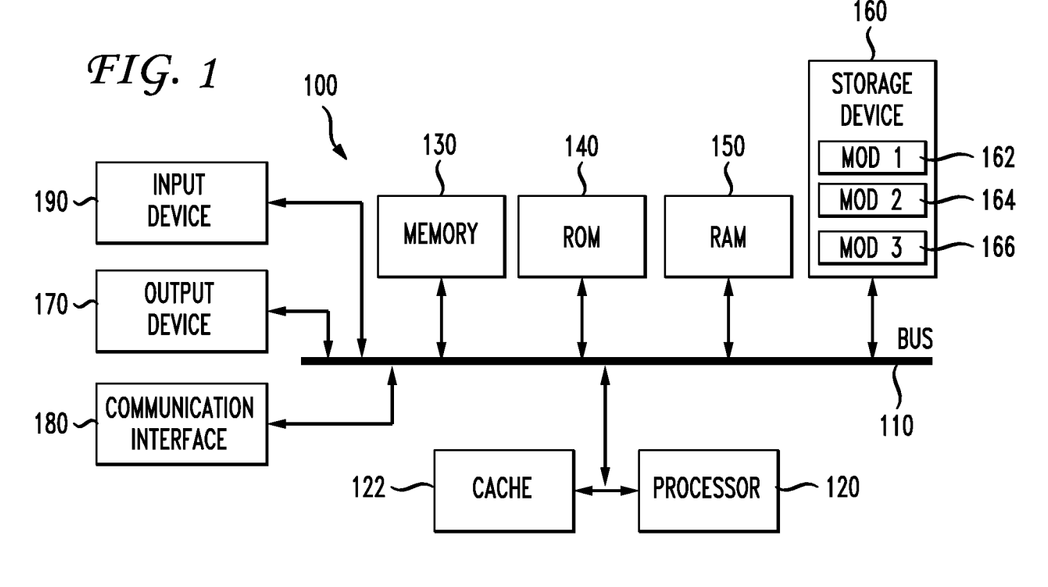
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache of high speed memory connected directly with, in close proximity to, or integrated as part of the processor 120. The system 100 copies data from the memory 130 and/or the storage device 160 to the cache for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, and the like, may also be used in the exemplary operating environment. Computer-readable storage media and devices expressly exclude transitory media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
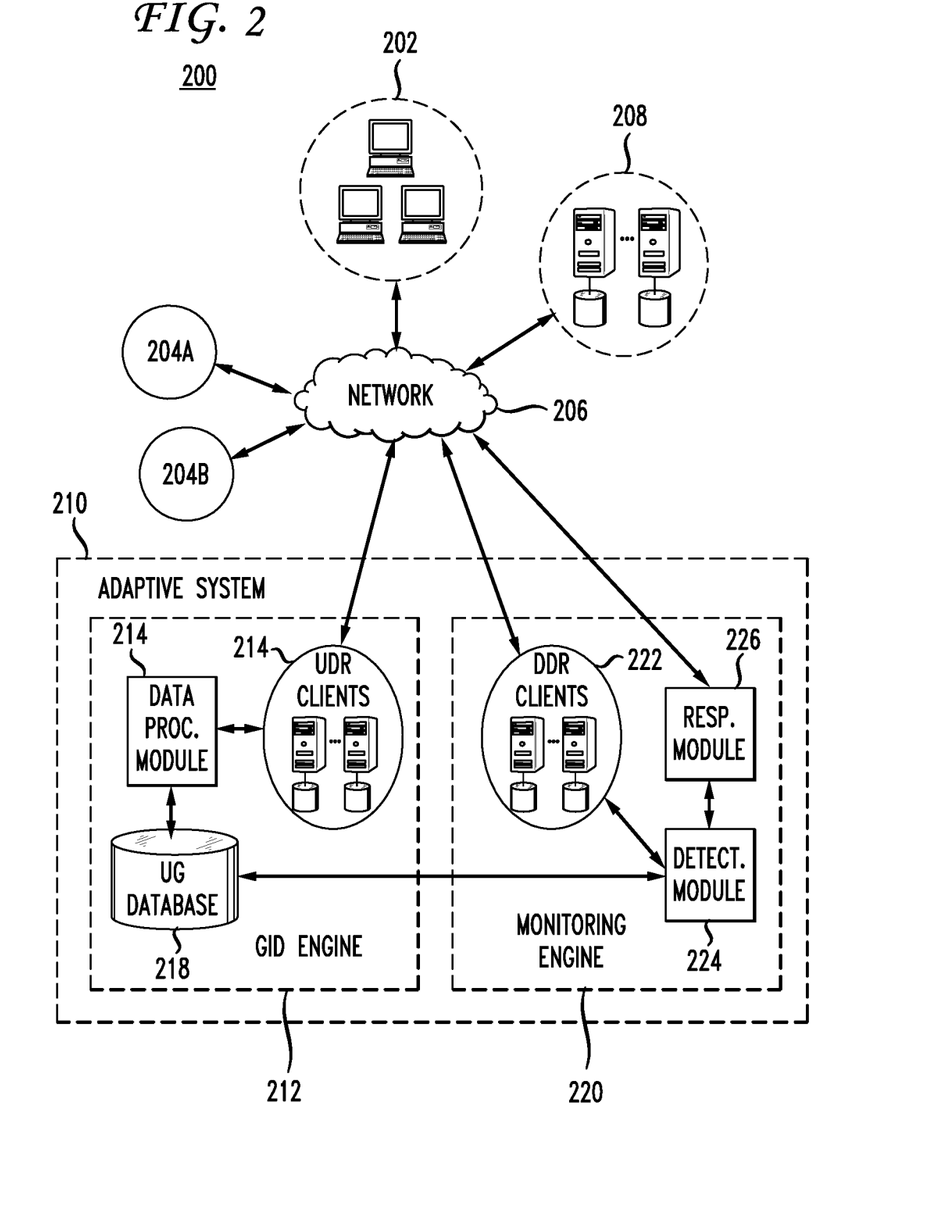
FIG. 2 illustrates an exemplary architecture in which the various embodiments can be implemented.

Having disclosed some components of a computing system, the disclosure now turns to FIG. 2, which illustrates an exemplary architecture 200 in which the various embodiments can be implemented.

As shown in FIG. 2, the architecture 200 includes one or more user terminals 202 associated with users and configured to access one or more electronic media channels 204 over a network 206. The electronic media channels 204 are at least partially controlled or managed by one or more entity systems 208 associated with an entity, such as an enterprise.

In some embodiments, the user terminals 202 and the entity systems 208 can each be embodied as one or more computing devices, such as those described above with respect to FIG. 1. However, in other embodiments, a user terminal and/or an entity system in the various embodiments can include more or less components than those shown in FIG. 1. Although the user terminals 202 and the entity systems 208 are shown as single, separate components in FIG. 2, the various embodiments are not limited in this regard. For example, each of user terminals 202 and entity systems 208 can be implemented in a localized or distributed fashion over network 206. Further, a user terminal and an entity system can be related or the same. That is, a user terminal and an entity system can be the same computing device or different parts of a same computing device.

In the various embodiments, the network 206 can be any type of communications infrastructure configured for supporting communications between the user terminals 202, the electronic media channels 204, and the entity systems 208. Accordingly, network 206 can be formed from one or more sub-networks. Thus, the network 206 can be embodied as any combination of wired or wireless communications links configured for the exchange of data.

As used herein, the term "electronic media channel" refers to any node or connection through which data can be transmitted or received and in, or stored. In the various embodiments, such electronic media channels can be embodied as one or more software components, one or more hardware components, or any combination thereof. For example, an electronic media channel can be embodied as node providing or supporting websites (including extranets and intranets), real-time communications applications and/or systems (e.g., voice and/or video communications), chat-type communication applications and/or systems (e.g., instant messaging, internet relay chat, Twitter®), electronic bulletin board applications and/or system, streaming media applications and/or systems (e.g., streaming audio and/or video), e-commerce applications and/or systems, and database applications and/or systems, to name a few. However, the various embodiments are not limited in this regard and any other electronic media channel type can be used without limitation.

In addition to the various components described above, architecture 200 also includes an adaptive system 210 coupled to network 206. In the various embodiments, the adaptive system 210 is configured access electronic media channels 204 to retrieve data regarding user behaviors and user characteristics, to identify groups of users, and to generate data for responding to user behaviors. Although shown as a separate, standalone system in FIG. 2, the adaptive system 210 can be combined with one or more other components in architecture 200. For example, in some embodiments, the adaptive system 210 can be associated with an entity, thus the adaptive system 210 can be implemented as part of one or more entity systems 208. Further, the adaptive system 210 can be implemented in a localized or distributed fashion over network 206.

As shown in FIG. 2, the adaptive system 210 can include a group identification (GID) engine 212 configured for retrieving user data, analyzing the user data, and yielding one or more groups of users based on the analysis of the user data. In particular, the GID engine 212 includes one or more user data retrieval (UDR) clients 214 to access the electronic media channels and retrieve user data therefrom. In addition to UDR clients 214, the GID engine 212 can also include a user data processing module 216. The data processing module 216 can be configured to analyze the data obtained by UDR clients 214 and yield one or more groups of users based on common user behaviors and/or common user characteristics. In the various embodiments, any type of social synchrony or homophily models can be used at data processing module 216 without limitation.

The GID engine 212 can further include a user/group (UG) database 218. The UG database 218 can be used to store group information generated by the data processing module 216. For example, the UG database 218 can be used to store group identifying information, such as membership, common user behaviors associated with the group, and common user characteristics associated with the group, to name a few. However, the various embodiments are not limited in this regard and the UG database 218 can be used to store any other type of group identifying information.

In some embodiments, the UG database 218 can also be used by UDR clients 214 to store user data being retrieved. Further, the UG database 218 can also be used as a working memory space for data processing module.

Although the GID engine shows components 214, 216, and 218 as separate, standalone elements, the various embodiments are not limited in this regard. In some embodiments, two or more of components 214, 216, and 218 can be combined into a single component performing the various operations described above.

In addition to the GID engine 212, the adaptive system 210 can also include a group monitoring engine 220. The monitoring engine 220 can be configured for monitoring user behaviors of users in a group in a domain of interest and provide an action in response to such observed user behaviors to deal with future user behaviors associated with other users in the group. To this end, the monitoring engine 220 can include at least one or more domain data retrieval (DDR) clients 222, a detection module 224, and a response module 226.

In the various embodiments, the DDR clients 222 can be used to retrieve user behavior data from electronic media channels associated with a domain of interest. The detection module 224 can be configured, based on user behavior data from the DDR clients 222 and group data in UG database 218, to determine whether the user behaviors in the user behavior data from the DDR clients 222 are associated with a user from a group in UG database 218. Thereafter, information regarding the group can be provided to the response module 226. The response module 226 can then utilize the information regarding to group to manage future user interactions in the domain. The management of these interactions will be described below in greater detail with respect to FIGS. 3, 4, and 5.

Although the architecture 200 is described with specific components have specific functionality, the various embodiments are not limited in this regard. In the various embodiments, one or more of the components in architecture 200 can be combined. Further, architecture 200 can be implemented in the localized or distributed fashion.

Figure 3:
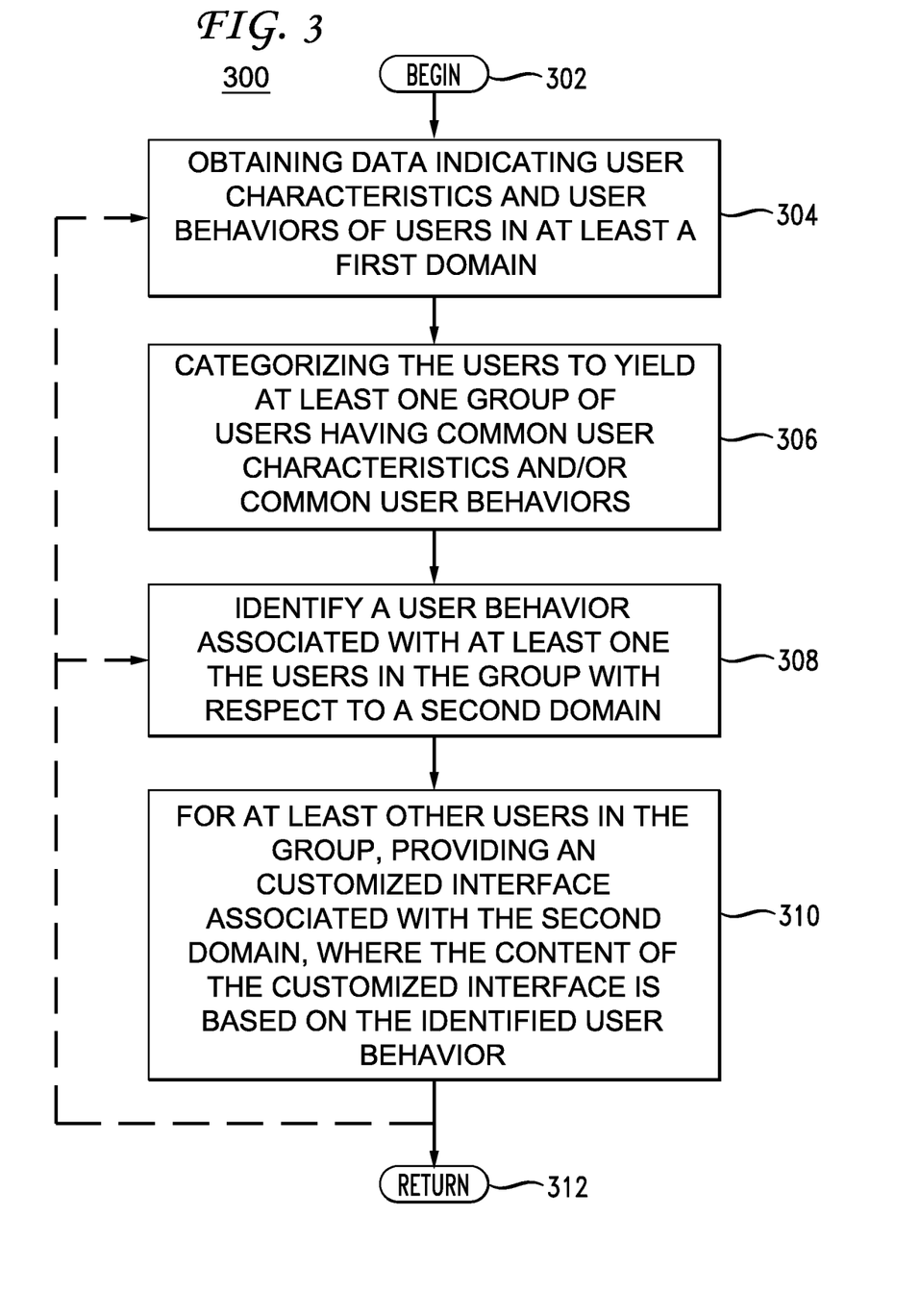
FIG. 3 illustrates a first example method embodiment.
Figure 4:
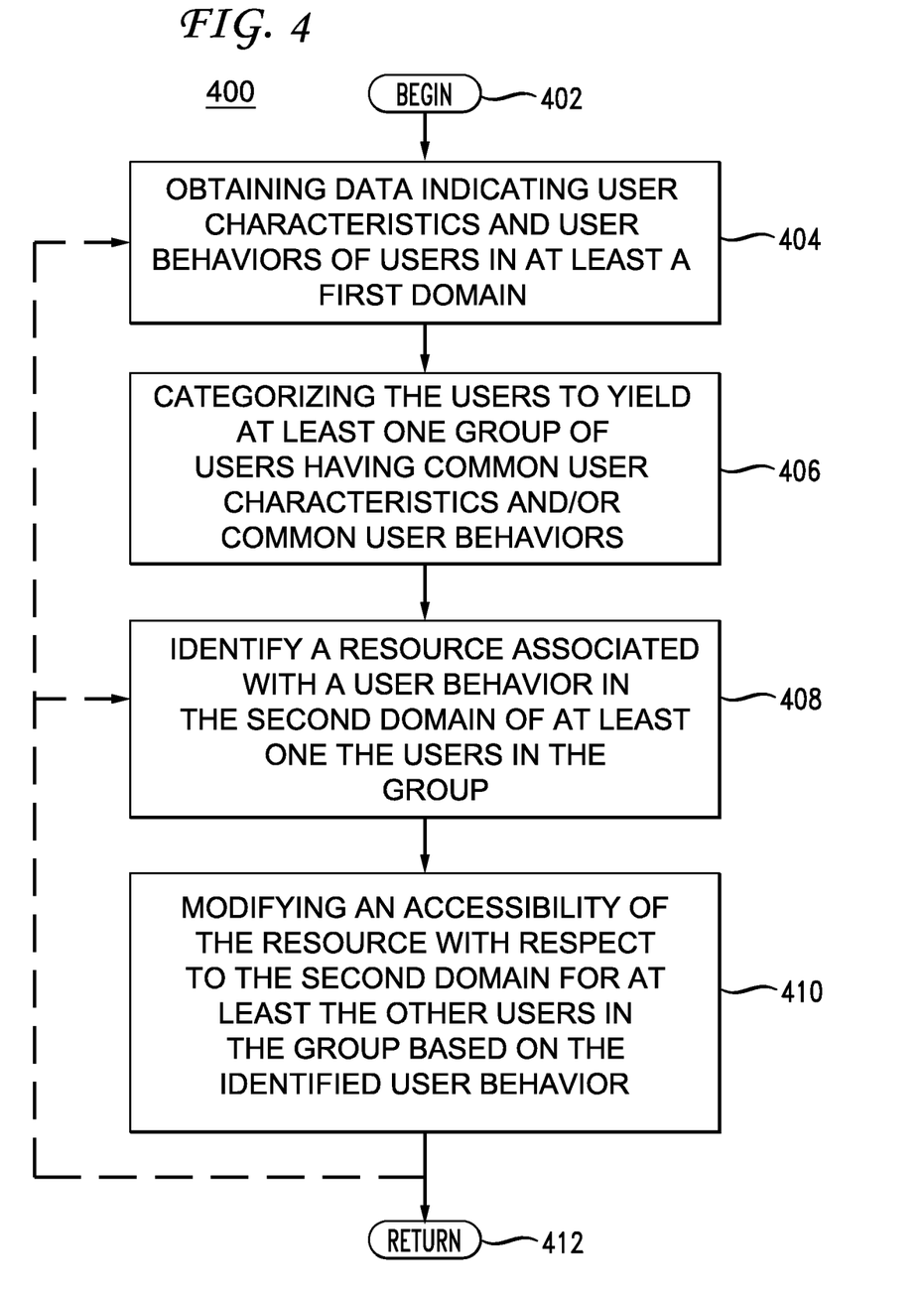
FIG. 4 illustrates a second example method embodiment.
Figure 5:
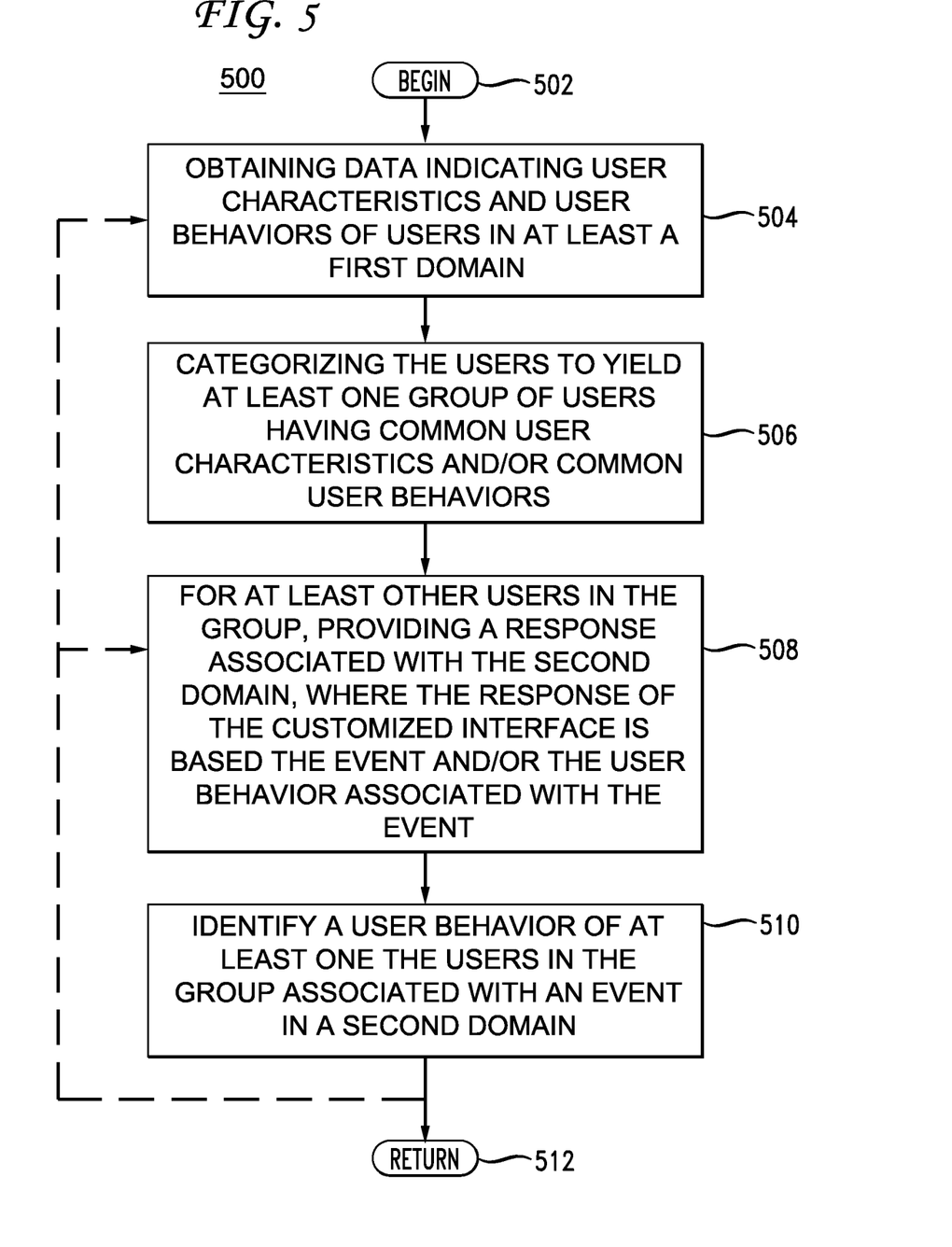
FIG. 5 illustrates a third example method embodiment.

Having disclosed some basic system components and concepts, the disclosure now turns to the exemplary method embodiments shown in FIGS. 3, 4, and 5. For the sake of clarity, the method is discussed in terms of an exemplary system 200 as shown in FIG. 2, configured to practice the method. The steps outlined herein are exemplary and can be implemented in any combination thereof, including combinations that exclude, add, or modify certain steps.

In the various embodiments, user behaviors can be used to manage an interface for interactions in a domain involving users in a group. This is illustrated below with respect to FIG. 3. FIG. 3 is a flowchart of steps in an exemplary method 300 for managing user interfaces. The method 300 begins at step 302 and continues on to step 304. At step 304, the method begins with obtaining data indicating user characteristics and/or user behaviors of users in at least a first domain. That is, as described above, the UDR clients 214 can access the electronic media channels 204 and retrieve user data showing the behaviors of a set of users in one or more domains. For example, in domain consisting of a website or other online resource, the UDR clients 214 can retrieve user data showing a history of interactions between the users and the website or online resource. In another example, in a domain consisting of a medical setting, the UDR clients 214 can retrieve user data showing a history of medical testing performed or ordered by health professionals in response to certain types of patients. In yet another example, the UDR clients 214 can retrieve user data showing a history of purchases or selections with respect to a particular group of goods and/or services.

Alternatively or in combination with the user behavior data, the UDR clients 214 can retrieve user data showing the characteristics of a group of users, as also described above. For example, biographic information for the user can be retrieved, such as age, sex, occupation, or location, to name a few. Also, interest information can be retrieved, such as hobbies and sports, memberships, and group registrations, to name a few. Further, other information can also be retrieved, such as product ownership. However, the various embodiments are not limited in this regard and user characteristic data can be any data describing any aspect of the user or the user's life.

Once the data is obtained at step 304, the method 300 can proceed to step 306. At step 306, the users can be characterized to yield at least one group of users, where the group consists of the users having the same or similar user behaviors or user characteristics with respect to a domain. As described above, such categorization can be performed by the data processing module 216 in the GID engine 212. As also described above, such categorization can be performed using any type of social synchrony or homophily models without limitation. As a result, the data processing module 216 can yield one or more groups of users and the group information can be stored at UG database 218.

It is worth noting that users can fall into more than one group, depending on the social synchrony and/or homophily models being used. However, in some embodiments, the data processing module 216 can be configured to allow a user to belong to only a single group. In such embodiments, the data processing module 216 can be configured to further analyze the user characteristic and/or user behaviors of such users and determine which group is more appropriate. For example, if a user appears to fall into two groups associated with different sets of user behaviors, the data processing module 216 can determine which set of user behaviors corresponds most closely to those of the user to select the appropriate group. Similarly, if a user appears to fall into two groups associated with different sets of user characteristics, the data processing module 216 can determine which set of user characteristics corresponds most closely to those of the user to select the appropriate group. In another example, if a user falls within two or more groups based on user characteristics, the user behaviors can be used to determine which of the groups is more appropriate. Similarly, if a user falls within two or more groups based on user behaviors, the user characteristics can be used to determine which of the groups is more appropriate.

After the categorization at step 306 is completed, the method 300 can proceed to step 308. At step 308, a user behavior associated with at least one user in a user group obtained at step 306, can be identified in a second domain. Such identification can be performed in two steps. First, the DDR clients 222 in group monitoring engine 220 can gather real-time user data regarding current user behaviors in the second domain. For example, the DDR clients 222 can collect data regarding user behaviors and associated users in real-time with respect to a website, a server, or any other type of system associated with the second domain. Second, as this data is received at the monitoring engine 220, the detection module 224 can ascertain whether the user behaviors are associated with any of the groups obtained at step 306. For example, the UG database 218 can be configured to store group and user information as a lookup table. In such a configuration, as the DDR client 222 obtains the user and associated user behavior data, the detection module can perform a lookup operation to determine whether the user behavior is associated with a user in any of the groups specified in UG database 218.

In the various embodiments, the DDR client 222 can be configured to monitor user behaviors in different ways. For example, in some embodiments, the DDR client 222 can be configured to monitor solely for user behaviors in the second domain associated with users from the groups specified in UG database 218. In other embodiments, the DDR client 222 can be configured to monitor for user behaviors in the second domain associated with any user and the detection module 224 can afterwards discard or ignore any data associated with such a new user not associated with a group in UG database 218. In still other embodiments, the DDR client 222 can be configured to monitor for user behaviors in the second domain associated with any user. Thereafter, if the detection module 224 determines that a user is a new user, as described above, the detection module 224 can be configured to cause the GID engine 212 to gather information regarding the new user and categorize the new user.

It is worth noting that in the various embodiments, the second domain can be a domain different than the first domain. However, the various embodiments are not limited in this regard and the first and second domains van be the same or similar.

Once a user behavior in the second domain and associated with a user in a group is identified at step 308, the method can proceed to step 310. As noted above, it has been observed that users in a group based on common user characteristics or common user behaviors generally tend to act in a similar manner in most domains, regardless of the domain associated with the initial grouping of the user. Thus, in the various embodiments of the invention, it is assumed that when one or more users of a group are observed performing an action in the second domain, the other users in the group will follow suit. Accordingly, this social synchrony or homophily among users can be used to manage user interactions the second domain.

Referring back to FIG. 3, method 300 provides an exemplary process for managing a user interface for users in a group in order to manage such user interactions. In particular, at step 310, a customized user interface can be generated for at least the other users in the group of users identified at step 308. However, the invention is not limited in this regard and the customized user interface can be generate for any user in the group. In the various embodiments, the form and content of the customized user interface can vary depending on the users, entities, and/or the second domain in question. That is, the customized user interface can consist of a default user interface, with the addition or subtraction of some the elements therein, or a rearrangement and/or a reconfiguration (e.g., color, size, shape) of the original elements of the default user interface.

In the various embodiments, the user behaviors at step 308 can be used to predict that other users in the group will perform the same actions in the same domain. In some embodiments, if the user behavior is associated with the accessing a particular resource associated with the second domain, the user interface presented to at least the other users in the group can be adjusted to reduce the difficultly or time involved in accessing the resource. For example, in the case of an online resource, a web page or other user interface can be adjust to include a direct link to the resource or provide a configuration that reduces the number of links that need to be followed to access the resource.

In some embodiments, the adjustment of the interface can be used to simplify tasks. For example, in the case of paper or electronic forms, the user behaviors can be used to adjust the forms to ease their completion or to include additional information. That is, the content of the forms and/or instructions for the forms can be adjusted based on the user behaviors of the group associated with the forms. For example, in the case of a medical setting, a form utilized by health professionals can be adjusted based on the behavior of other health professionals in a same group. In another example, the forms for treating patients in a group can be adjust based on behaviors of other patients in the group. Thus, a "user behavior", as used herein is not explicitly limited to voluntary user actions and can also include involuntary user responses or resulting behaviors or events due to the actions of the users in the group or other persons interaction with the users in the group. For example, based the response of one or more users in a group to a medication, protocol, or procedure, information provided to a health professional, via a form or other source, can be configured to including warnings, suggest alternative to treatment, or provide any other information for mitigating the recurrence of a negative or improve the likelihood of a positive response.

The methods described above are also equally applicable to any other domain. For example, improved instructions for configuring and operating products can be provided to users in a group based on, for example, prior feedback of one or more users in a group. In another example, products purchased by users in a group can be preconfigured in accordance with the configuration utilized by other users in the group. Other types of adjustments are also possible.

In some cases, an entity may regard the user behavior at step 308 as unwanted or undesirable. Therefore, in some embodiments, the user interface can be configured to mange such behaviors. For example, an entity may not wish users to frequent access particular resources. In another example, an entity may not wish that an interaction with a user result in particular processes being performed (e.g., additional medical testing or misuse of a resource). In such cases, the user interface can be reconfigured to redirect the user behaviors of users in the group. For example, a user interface can be configured to make it more difficult to access or locate a resource or a form can be configured to make it more difficult to allow certain procedures to be performed or can promote more desirable procedures. Such a configuration can be used when the resource is limited, results increased costs or loss of revenue for the entity, or results in other negative or undesirable results for the entity.

Referring back to FIG. 3, the customized interface can be provided at step 210 in conjunction with operation of the response module 226. For example, when the detection module 224 detects a user behavior associated with a user in a group, the detection module 224 can forward the group information and information regarding the user behavior to response module 226. The response module 226 can then, directly or indirectly, cause the customized interface to be provided. For example, in the case of directly causing the customized interface to the provided, the response module 226 can be part of the entity system 208 providing the interface. In such a configuration, the response module 226 can be configured to manage the entity system 208 such that when a interface is request for an interaction involving users from the group associated with the user behavior identified at step 308, the response module causes the entity system

208 to produce the customized interface. For example, the response module 226 can specify rules for producing the customized interface.

In an indirect method, the response module 226 can be configured to inform the entity system 208 how to manage an interaction involving users from the group associated with the user behavior identified at step 308. For example, the response module 226 can provide the entity system 208 with a message indicating users in a group and the user behavior detected. The entity system 208, based on its own rules, can then generate the customized interface.

Once the customized interface is provided at step 310, or at least instructions for doing so, the method can end at step 312. However, in some embodiments, the customized interface can be continually updated based on the user behaviors or changes in the groups. For example, in some embodiments, the method 300 can return to step 308. That is, once a first custom interface is provided, additional user behaviors in the second domain can be identified at step 308 and the interface can be further customized at step 310. Additionally, in some embodiments, the groups can be dynamically adjusted. That is, periodically or continuously, the makeup of the groups can be reevaluated. For example, the method 300 can return to step 304.

In the various embodiments, user behaviors can also be used to manage resources associated with users in a group. This is illustrated below with respect to FIG. 4. FIG. 4 is a flowchart of steps in an exemplary method 400 for managing resources. The method begins at step 402 and continues on to step 404. At step 404, the method begins with obtaining data indicating user characteristics and/or user behaviors of users in at least a first domain. This step is substantially similar to step 304 in method 300. Accordingly, the description above with respect to step 304 is sufficient for describing step 404.

Once the data is obtained at step 404, the method 400 can proceed to step 406. At step 406, the users can be characterized to yield at least one group of users, where the group consists of the users having the same or similar user behaviors or user characteristics with respect to a domain. This step is substantially similar to step 306 in method 300. Accordingly, the description above with respect to step 306 is sufficient for describing step 406. Thereafter, the method 400 proceeds to step 408.

As described above, users in a group based on common user characteristics or common user behaviors generally tend to act in a similar manner. As a result, users in such a group not only perform the same actions, but typically require access to the same resources to perform such actions. Thus, in the various embodiments, resources can be managed based on user behaviors. Accordingly, once the users are categorized at step 406, resources associated with a user behavior in the second domain for at least one of the users from a group can be identified at step 408.

At step 408, an identification of user behaviors associated with users in a group can first be performed, by the detection module 224, as described above with respect to step 308 in FIG. 3. However, in addition to identifying such user behaviors associated with a group, the detection module 224 or the response module 226 can be configured to analyze the behavior in the second domain and determine which resources are involved with the user behavior. For example, in the scenario described above regarding a web page, where the identified user behavior is the selection of a link on a web page, step 408 identifies not only the group associated with the user behavior, but the particular resource or target associated with the link. In another example, regarding a scenario in a medical setting, where the indentified user behavior is selection of a particular treatment or test, the resources required for performing such a treatment or test can be identified. In such a configuration, a database of treatments or tests, internal or external to adaptive system 210, can be provided to allow the detection module 224 or the response module 226 to lookup the particular resources associated with specific tests or treatments. In yet another example, regarding a product (i.e., goods and/or service), where the identified resource is the demand for the product, the resources required for supplying the product to users can be identified. Once the group and the resource associated with the user behavior is identified at step 408, the method can proceed to step 410.

At step 410, the accessibility of the resource, with respect to the second domain, can be adjusted for at least the other users in the group and based on the user behavior. That is, ensuring that when the identified user behavior recurs with respect to the other user in the group, the resource will be available.

In the various embodiments, modification of the accessibility to the resources can be performed directly or indirectly by the adaptive system 210. For example, the response module 224, in response to an identification of the resource at step 408, can directly or indirectly cause adjustment of accessibility to the resource needed to support the user behavior.

For example, in a direct adjustment, the response module 224 can be linked to or be part of an entity system 208 associated with a resource. The response module 224, in conjunction with a set of rules or instructions in adaptive system 210, can then cause the entity system 208 to allocate additional capacity to the resource. In the case of an online or electronic resource, such as server, this can mean causing the allocating additional processing capacity, storage capacity, or bandwidth for the server. In the case of a medical setting, this can mean automatically causing the allocating of additional personnel, ordering additional supplies, and instigating additional rules for performing such tests and treatments. In the case of a product, this can mean causing the allocating of additional manufacturing, support, and supply chain personnel or capacity, requesting additional raw materials or supplies, and allocating additional communications resources, to name a few. These exemplary scenarios are provided by way of example and not limitation. Accordingly, the various embodiments can also be used to identify any other resources needed for supporting identified user behaviors.

In an indirect adjustment scenario, the adaptive system 210 can instead generate messages for entity indicating a resource and a group associated with the resource. In some cases, this can be in the form of a projected demand for the resource. The entity system 208 can then adjust the accessibility of the identified resource based on this information and its own rules.

In some embodiments, improving accessibility can also include improving how users can access the resource. In such embodiments, this can result in accessibility being modified by adjusting a user interface for the users in the group. For example, in the case of an electronic user interface, direct links to resources can be provided and/or pre-populated or pre-selecting data input elements can be provided, for example. However, the various embodiments are not limited in this regard and any other user interface changes for improving access to resources for users can be provided.

Once the availability of the resource is modified at step 410, or at least instructions for doing so are provided, the method can end at step 412. However, in some embodiments, the availability of resources can be continually updated based on the user behaviors or changes in the groups. For example, in some embodiments, the method 400 can return to step 408. That is, once an availability of a resource is modified, additional user behaviors in the second domain can be identified at step 408 and the availability of the resource or other resources can be further adjusted at step 410. Additionally, in some embodiments, the groups can be dynamically adjusted. That is, periodically or continuously, the makeup of the groups can be reevaluated. For example, the method 400 can return to step 404.

In the various embodiments, user behaviors can also be used to provide a response to an event for users in a group. This is illustrated below with respect to FIG. 5. FIG. 5 is a flowchart of steps in an exemplary method 500 for managing information for users. The method begins at step 502 and continues on to step 504. At step 504, the method begins with obtaining data indicating user characteristics and/or user behaviors of users in at least a first domain. This step is substantially similar to step 304 in method 300. Accordingly, the description above with respect to step 304 is sufficient for describing step 504.

Once the data is obtained at step 504, the method 500 can proceed to step 506. At step 506, the users can be characterized to yield at least one group of users, where the group consists of the users having the same or similar user behaviors or user characteristics with respect to a domain. This step is substantially similar to step 506 in method 300. Accordingly, the description above with respect to step 506 is sufficient for describing step 506. Thereafter, the method 500 proceeds to step 508.

As described above, users in a group based on common user characteristics or common user behaviors generally tend to act in a similar manner. As a result, users in such a group not only perform the same actions and access the same resources, but also tend to be exposed to the same sources of information. Further, such users tend to rely on other users in the group with respect to advice and information regarding goods and services. Accordingly, information viewed or generated by one the users in the group may end up being viewed or even duplicated by all users in group. For example, the case of a negative view with respect to good and services, viral propagation of negative view is highly likely within the group. Even worse, these negative views can go beyond the group of users and can even spread among other groups of user. Accordingly, in the various embodiments of the invention, user behaviors can also be used to respond to such event by managing the flow of information among users in a group, providing communications for a group, or providing communications for entities associated with the event.

Referring back to FIG. 5, following the categorization of users at step 506, the method can proceed to step 508. At step 508, a user behavior of at least one of the users in a group and associated with an event or incident can be identified. At step 508, an identification of user behaviors associated with users in a group can first be performed, by the detection module 224, as described above with respect to step 308 in FIG. 3. However, in addition to identifying such user behaviors associated with a group, the detection module 224 or the response module 226 can be configured to analyze the event associated with the user behavior. That is, identifying the event leading to or caused by the user behavior. For example, such events associated with a user behavior can include, but are not limited to: providing or reading bad ratings of a product (goods or services), termination of a contract, switching between service providers, switching credit card balances, turning down offers for product (e.g., new, upsell, or upgrade offers). Other types of events can be related to events with a negative impact on resources. For example, they can include events associated with resources available in limited supply or events associated with resources having increased costs. However, the various embodiments are not limited in this regard and any other type of event caused by or resulting in a user behavior can be identified in the various embodiments. For example, the events identified can also be associated with a positive impact.

In the various embodiments, the number and type of events identified and ultimately addressed can vary. For example, in some embodiments, any event associated with a user behavior for a user from a group can be identified. However, although various types of events can be associated with a user behavior of a user from the group, some of these events may be of little or no use in managing resources or user behaviors. Accordingly, in other embodiments, only specific types of events can be identified. For example, only events with a negative result can be identified. In another example, only events associated with particular negative results can be identified. However, the various embodiments are not limited in this regard and any criteria can be used for selecting the events to be identified.

Once an event, an associated user behavior, and an associated group have been identified at step 508, the method can proceed to step 510. At step 510, a response to the event can be provided for at least the other users in the group, where the response is based on the user behavior identified at step 508.

In the various embodiments, the response to the event can be provided directly or indirectly by the adaptive system 210, alone or in concert with an entity system 208 associated with the event. For example, the response module 224, in response to an identification of the event at step 508, can directly or indirectly cause a response to be generated to address the event associated with the user behavior at step 508.

For example, in a direct response to a negative event with respect to a product, the response module 224 can directly cause, according to a set of rules in the adaptive system 210, that a communication be generated and delivered to at least the other users in the group to counter any negative perceptions of the product. Such a communication can be direct to the users, such as email or direct mailings to each of the users, or can be targeted, such as advertisements or posting messages via social media channels (e.g., Facebook®, Twitter®, electronic message boards). In the case of targeted communications, the response module 224 can be configured to look at past user behaviors for the users in the group and predict media channels (electronic or otherwise) they are likely to access. The advertisement can then be placed on such media channels.

In some embodiments, a response need not be directed, at least explicitly, to the user. That is, the response can be directed to the entity or entity systems 208 to provide corrective action. For example, the response can be the triggering of reallocation of resources in response to such events, similar to that described above with respect to FIG. 4. In another example, such as in the case of products having limited availability or other issues and resulting in negative comments from users from the group, the response can be to cause changes in the allocation of resources with respect to the group for such products. In another example, such as the case of an event having a negative impact on an entity, the response can be provide changes in user interfaces, resources, or communications, to redirect users, adjust resources, or generate communications to reduce or counter such negative impacts.

In an indirect adjustment scenario, the adaptive system 210 can instead generate messages for entity indicating a event, a user behavior, and a group associated with the resource. The entity system 208 can then adjust the accessibility of the identified resource based on this information and its own rules.

As noted above, the events monitored can also be events with a positive impact. Accordingly, in response to the detection of such events, a response can be generated. For example, in the case of user behaviors associated with users in a group and resulting in a positive result for an entity, the response can be to provide communications to the other users in the group indicating as much. In some cases, an enticement or offer can be provided to encourage the desired behavior.

Once the response is provided at step 510, or at least instructions for doing so are provided, the method can end at step 512. However, in some embodiments, the availability of resources can be continually updated based on the user behaviors or changes in the groups. For example, in some embodiments, the method 500 can return to step 508. That is, once an availability of a resource is modified, additional user behaviors in the second domain can be identified at step 508 and the availability of the resource or other resources can be further adjusted at step 510. Additionally, in some embodiments, the groups can be dynamically adjusted. That is, periodically or continuously, the makeup of the groups can be reevaluated. For example, the method 500 can return to step 504.

In the various embodiments described above, the user behaviors being monitored can vary. For example, in some embodiments the user behaviors being monitored can be those associated with one or more selected or pre-defined users in the group. Accordingly, unless the user behavior in the second domain is associated with one of these pre-defined users, no action is taken with respect to the rest of the group. In other embodiments, a critical mass of users can be required. That is, unless the user behavior in the second domain is associated with a selected number or percentage of users in the group, no action is taken with respect to the rest of group. In other embodiments, a combination of these can be used.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method, comprising:
   receiving, by a server connected to a network, requests for access to a resource from user devices via the network and the user devices being associated with users;
   allocating, by the server, a capacity of the server to a first capacity to enable the server to provide the user devices with a first level of access to the resource;
   providing, by the server, the resource to the user devices utilizing the first capacity;
   identifying, by the server, from the users, a group of users comprising a portion of the users that share one of a common user characteristic and a common user behavior as observed in association with a first domain;
   selecting, by the server, a monitored user from the group of users;
   monitoring, by the server, a behavior of the monitored user with respect to a second domain different from the first domain;
   predicting, by the server and based on the behavior of the monitored user, an expected behavior of a non-monitored user of the group of users with respect to the resource; and upon determining that the predicted expected behavior of the non-monitored user of the group of the users is more closely associated with a second capacity of the server, allocating, by the server, the capacity of the server to the second capacity to enable the server to provide the user devices a second level of access to the resource, and providing, by the server, the resource to the user devices utilizing the second capacity.

2. The method of claim 1, wherein the server comprises a plurality of servers.

3. The method of claim 1, wherein identifying the group of the users further comprises identifying the group of the users from a set of the users sharing both the common user characteristic and the common user behavior.

4. The method of claim 1, wherein monitoring of the monitored user further comprises monitoring the monitored user with respect to a second domain resource of the second domain.

5. The method of claim 1, wherein the second capacity of the server comprises a reduced capacity of the server as provided by the server comprising the first capacity.

6. The method of claim 1, wherein the capacity comprises a bandwidth capacity.

7. The method of claim 1, wherein the capacity comprises a storage capacity.

8. The method of claim 1, wherein the capacity comprises a processing capacity.

9. The method of claim 1, further comprising:
providing, by the server, a graphical user element associated with the resource for display by the user devices, wherein the graphical user element is selected in accord with the expected behavior.

10. A system comprising:
a server having a processor and a network interface; and the server performs:
    receiving requests for access to a resource from user devices via the network interface and the user devices being associated with users;
    allocating a capacity of the server to a first capacity to enable the server to provide the user devices with a first level of access to the resource;
    providing the resource to the user devices utilizing the first capacity;
    identifying, from the users, a group of users comprising a portion of the users that share one of a common user characteristic and a common user behavior as observed in association with a first domain:
    selecting a monitored user from the group of users;
    monitoring a behavior of the monitored user with respect to a second domain different from the first domain:
    predicting, based on the behavior of the monitored user, an expected behavior of a non-monitored user of the group of users with respect to the resource; and
    upon determining that the predicted expected behavior of the non-monitored user of the group of the users is more closely associated with a second capacity of the server, allocating the capacity of the server to the second capacity to enable the server to provide the user devices a second level of access to the resource, and providing, by the server, the resource to the user devices utilizing the second capacity.

11. The system of claim 10, wherein the server comprises a plurality of servers.

12. The system of claim 10, wherein identifying the group of the users further comprises identifying the group of the users from a set of the users sharing both the common user characteristic and the common user behavior.

13. The system of claim 10, wherein monitoring of the monitored user further comprises monitoring the monitored user with respect to a second domain resource of the second domain.

14. The system of claim 10, wherein the second capacity of the server comprises a reduced capacity of the server as provided by the server comprising the first capacity.

* * * * *